United States Patent [19]

Torres

[11] Patent Number: 5,410,692
[45] Date of Patent: Apr. 25, 1995

[54] METHOD FOR ENHANCING INTERACTIVE QUERY OF A DATABASE

[75] Inventor: Robert J. Torres, Colleyville, Tex.

[73] Assignee: International Business Machines Corporation, Armonk, N.Y.

[21] Appl. No.: 178,584

[22] Filed: Jan. 7, 1994

Related U.S. Application Data

[63] Continuation of Ser. No. 770,508, Oct. 3, 1991, abandoned.

[51] Int. Cl.⁶ ..................... G06F 15/40; G06F 3/14
[52] U.S. Cl. ................................. 395/600; 395/425; 364/DIG. 2
[58] Field of Search ............... 395/600, 275, 650, 425; 364/900

[56] References Cited

U.S. PATENT DOCUMENTS

| | | | |
|---|---|---|---|
| 4,255,796 | 3/1981 | Gabbe | 395/600 |
| 4,451,901 | 5/1984 | Wolfe | 395/600 |
| 4,825,354 | 4/1989 | Agrawal | 395/600 |
| 4,827,447 | 5/1989 | Croes | 364/419 |
| 5,007,019 | 4/1991 | Squillante | 395/275 |
| 5,040,113 | 8/1991 | Mickunas | 364/419 |
| 5,058,000 | 10/1991 | Cox | 395/600 |
| 5,278,946 | 1/1994 | Shimada | 395/600 |
| 5,278,980 | 1/1994 | Pederson | 395/600 |
| 5,303,361 | 4/1994 | Colwell | 395/425 |

FOREIGN PATENT DOCUMENTS 351233  1/1990  European Pat. Off. .

OTHER PUBLICATIONS

Wordperfect, 1988, pp. 76–78, 574–579, 586, 600–603.
Dialog System Seminar, pp. 4–1 to 4–12 and A–26 (Aug. 1990).
"Muse: A Multimedia Filing System", I.E.E.E. Software, vol. 4, No. 2, Los Alamitos, U.S., Mar. 1987, p. 6, col. 2, line 13–p. 7, col. 1, line 13; FIGS. 1, 3, 5; p. 8, col. 1, line 1–p. 9, col. 1, line 31.
American Chemical Society, "Guide To Commands", STN Manual, May, 1991, p. 22, paragraph 2; p. 46–p. 50; p. 63–p. 67; p. 83–p. 89.

Primary Examiner—Thomas G. Black
Assistant Examiner—Jean R. Homere
Attorney, Agent, or Firm—Jonathan E. Jobe; Andrew J. Dillon

[57] ABSTRACT

A data processing system has access to a memory storing a data or other information base. The data processing system evaluates objects from the data base against search criteria generated from parameters entered into the data processing system by a user. As objects are located by execution of a search program meeting the search criteria, those objects are identified to the user while the search continues. The user can access the object for substantive evaluation for conformance to the desired target data. The user may enter modified parameters based upon his evaluation of such results as obtained. The data processing system then continues the search over each part of the database as the user designates.

4 Claims, 9 Drawing Sheets

CONVENTIONAL SEARCH PANEL WITH NEW ACTIONS

Fig. 3  SEARCH IN PROCESS & ACTIVE CRITERIA WINDOW

SEARCH RESULTS—STOP/RESUME WITH NEW CRITERIA

METHOD FOR ENHANCING INTERACTIVE QUERY OF A DATABASE

This is a continuation of application Ser. No. 07/770,508, filed Oct. 3, 1991, and now abandoned.

BACKGROUND OF THE INVENTION

1. Field of the Invention

This invention relates in general to a method for enhancing recovery of data from a database, and in particular to accelerating generation of search arguments leading to recovery of specific data from the database. Still more particularly, the invention relates to methods generating a dynamic dialog between a data processing machine used to access the database and a user by providing the user access to results of a search as those results are obtained by the data processing machine and accepting refinement of search arguments conceived by the operator during the course of the search.

2. Description of the Prior Art

The prior art teaches the programming of data processing systems for searching through information to retrieve particular pieces of data. An example of such a system is the LEXIS TM legal research system of Mead Data Central, Dayton, Ohio. Such prior art systems access information which has been organized into a database. A database consists of objects, i.e., discrete packets of related information, such as the text of an article. The data processing system recovers the object if the object meets certain criteria. In the example of an article, the criteria could be the presence of a certain series of words in the text. The object is identified to the user and the contents of the object are made available for the user's perusal.

Database searching allows a user to quickly recover collections of objects meeting virtually any criteria a user can compose. A problem with prior art systems has been that they return recovered objects only upon completion of a search. In other words, all objects in a database must be evaluated for conformance to the search criteria before the searcher can review the results. This can be time consuming. It can also present the user with a mass of material effectively as overwhelming as the original database. The user may discover upon completion of a search that the original search criteria were not effective in returning the desired data. This can occur because the operator is unsure of terminology, or because the user defined the criteria too narrowly, or because the user lacked clear understanding of just what was desired, or for a host of other reasons. Obtaining the desired data is hindered by the necessity of waiting for each level or iteration of a search to be completed before the search parameters can be modified, altered or replaced by reference to the search results for the prior parameters.

A conventional approach to searching information is a "search dialog" wherein a command is invoked from a graphical menu system, parameters are filled in a "pop-up window" and results are delivered to a window upon completion of the search. This approach does not fully exploit the capabilities of most data processing systems. Typically, many iterations of the search parameters are required to refine the criteria to solve the user's problem.

SUMMARY OF THE INVENTION

It is therefore one object of the present invention to provide a method of enhancing recovery of desired data from a database.

It is another object of the present invention to provide a method of accelerating the user's generation of search arguments leading to recovery of the desired data from the database.

It is still another object of the present invention to provide a method for generating a dynamic dialog between a data processing machine used to access a database and the user, where the user can access results of a search as obtained by the machine and can repeatedly refine the search arguments during the course of the search with reference to results as obtained.

The foregoing objects are achieved as is now described. A data processing system has access to a memory storing a data or other information base. The data processing system evaluates objects from the data base against search criteria generated from parameters entered into the data processing system by a user. As objects are located by execution of a search program meeting the search criteria, those objects are identified to the user while the search continues. The user can access the qualified objects for conformance to the desired target data. The user may enter modified parameters based upon his evaluation of such results as obtained. The data processing system then continues the search over such part of the database as the user designates.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
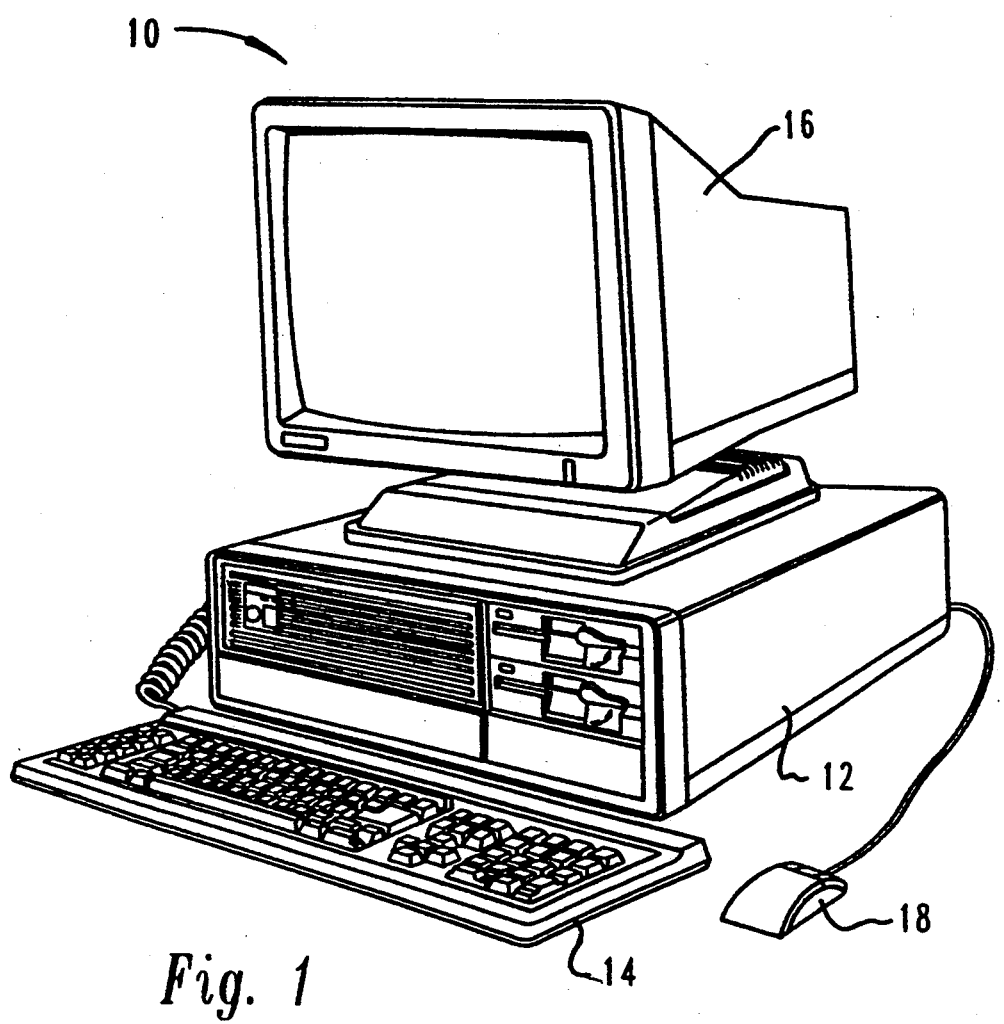
FIG. 1 is pictorial representation of a computer incorporating the present invention.

With reference now to the figures and in particular with reference to FIG. 1, there is depicted a pictorial representation of a personal computer system 10 which may be utilized in accordance with the method of the present invention. Personal computer system 10 includes a computer 12, preferably provided by utilizing an IBM Personal System/2 or similar system. Personal computer system 10 generally includes a keyboard 14, a video display device 16 and may include a mouse 18. Keyboard 14, video display device 16 and mouse 18 are utilized to allow user input to computer 12 and to provide user discernable messages.

Figure 2:
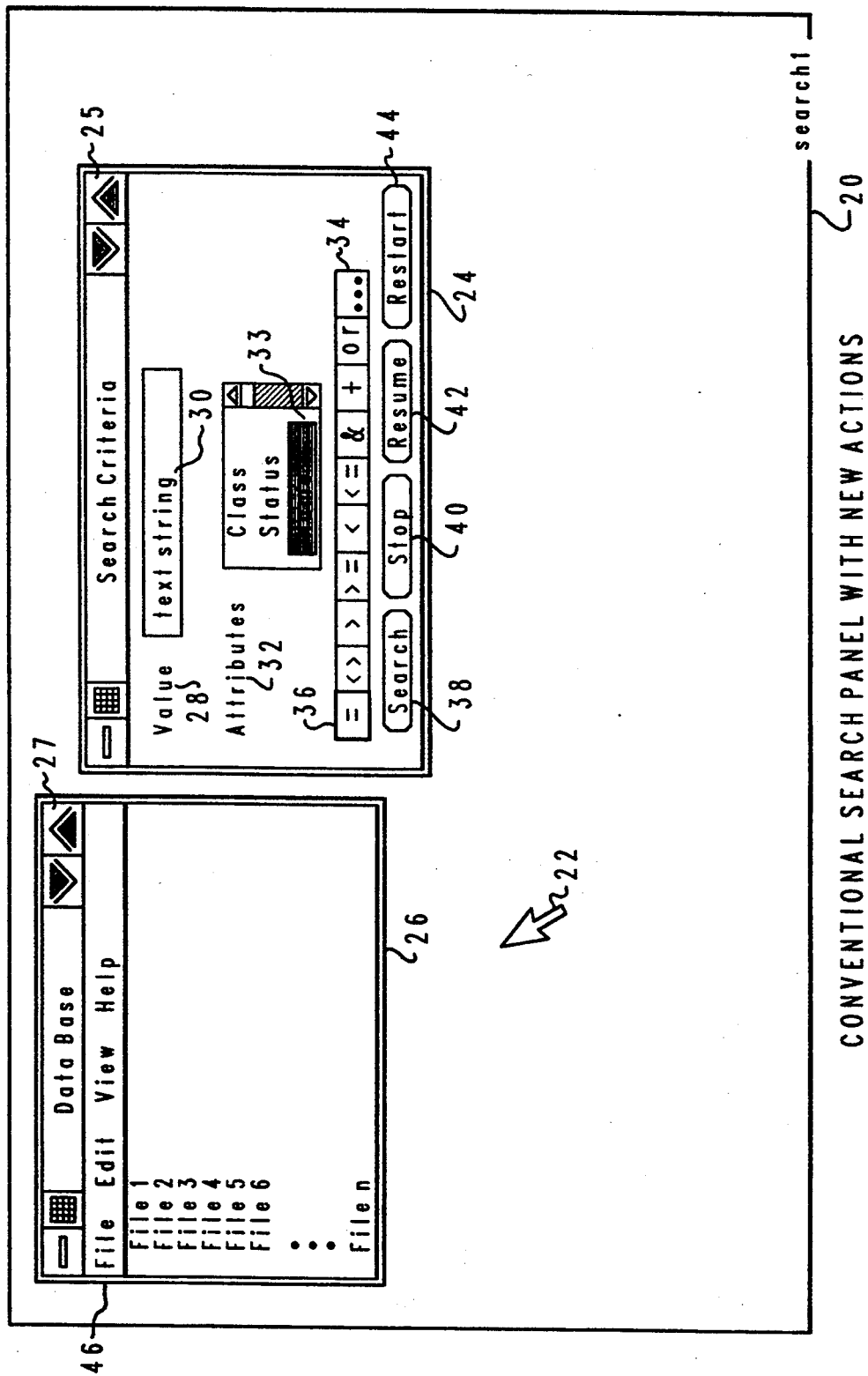
FIG. 2 is pictorial representation of a plurality of windows imaged on a computer display screen.

FIG. 2 illustrates a pictorial representation of a computer display screen 20 on which are imaged a mouse pointer 22 and windows 24 and 26. Windows 24 and 26 are generated by a computer application program, in this case a database management program. Windows 24 and 26 include window title bars 25 and 27, respectively.

Window 24 is the search criteria frame. Through interaction with window 24 the user may select search criteria which can include values 28 such as strings of text, entered through a value entry field 30. The text string appears in entry field 30, indicating the location where text search parameter may be entered by a user. A database includes a plurality of files or objects, which are the subject of the search. Objects may include data, such as strings of text, authorship, and categorical classification. The user selects object attributes 32 in selection field 33. Attributes 32 relate back to an entry field 30 for a value. Entry field 33 for attributes 32 may be scrolled to bring different attributes into the field of view. Particular attributes may be highlighted by moving mouse pointer 22 to a particular attribute and selecting that attribute. Object attributes selected are highlighted after selection. A field of logical operators 34 includes an equality operator, a not equal operator, a greater than operator, a greater than and equal to operator, a less than operator, a less than and equal to operator, a logical "AND" operator, a plus operator, and a logical OR operator. Ellipses at the end of field 34 indicate additional operators which may be accessed. A selected operator, here the equality symbol, is highlighted by a box 36 surrounding the operator. Operators may be selected by moving mouse pointer 22 to a box and pressing a select button on mouse 18.

A user controls operation of the search through four selection buttons appearing near the bottom of window 24. Initiation of evaluation of the database in terms of values freshly entered through search criteria box window 24 is done by selecting "search" button 38. A "Stop" button 40, upon selection, interrupts a search. A "Resume" button 42, upon selection, causes resumption of an interrupted search over a selected portion of the database. A "Restart" button 44, upon selection, initiates a modified search over the entire database. A search may also be cancelled by exiting window 24.

Database window 26 allows direct access to a database as well as displaying captions for files in a particular database. Database window 26 includes menu bar 46 for accessing the contents of a database for viewing, and editing. A help routine is accessed through menu bar 46.

Figure 3:
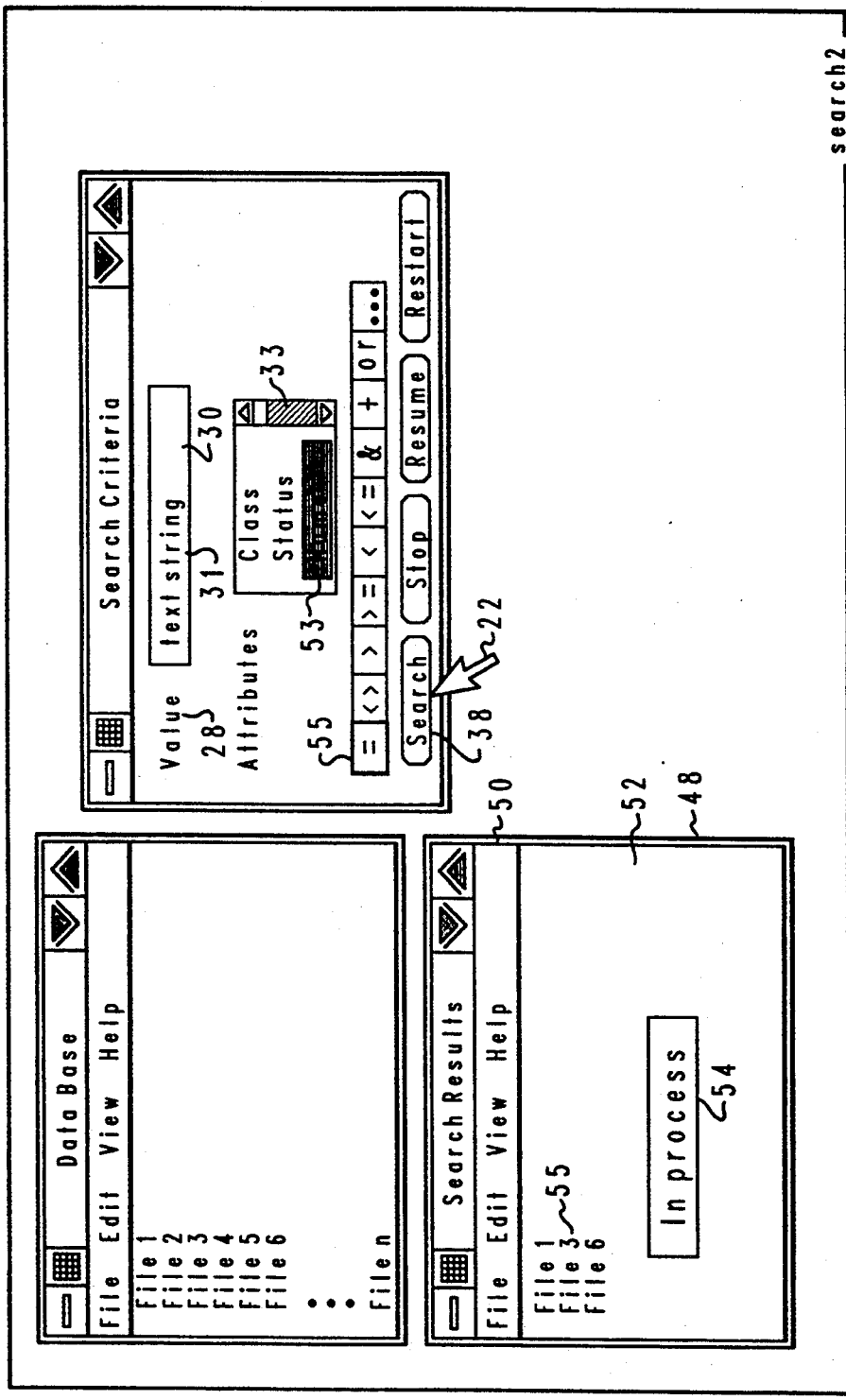
FIG. 3 is a pictorial representation of a plurality of windows imaged on a computer display screen after a search has been initiated using and initial search criteria set.

FIG. 3 illustrates in pictorial representation a computer display screen 20 after definition of a search and commencement of that search. Window 24 exhibits a text value 31 in field 30. An attribute 53 has been selected in attribute entry field 33. Mouse pointer 22 has been moved to the "Search" button 38 and selected, indicating a search has been selected. A search results window 48 has been generated and displayed. Search results window 48 resembles database window 26 and includes menu bar 50 and a results display field 52. An "In Process" message 54 appears in window 48 indicating a search is in process. Results 55 thus far obtained are displayed in results display field 52. Results 55 may be opened for viewing as the search proceeds.

Figure 4:
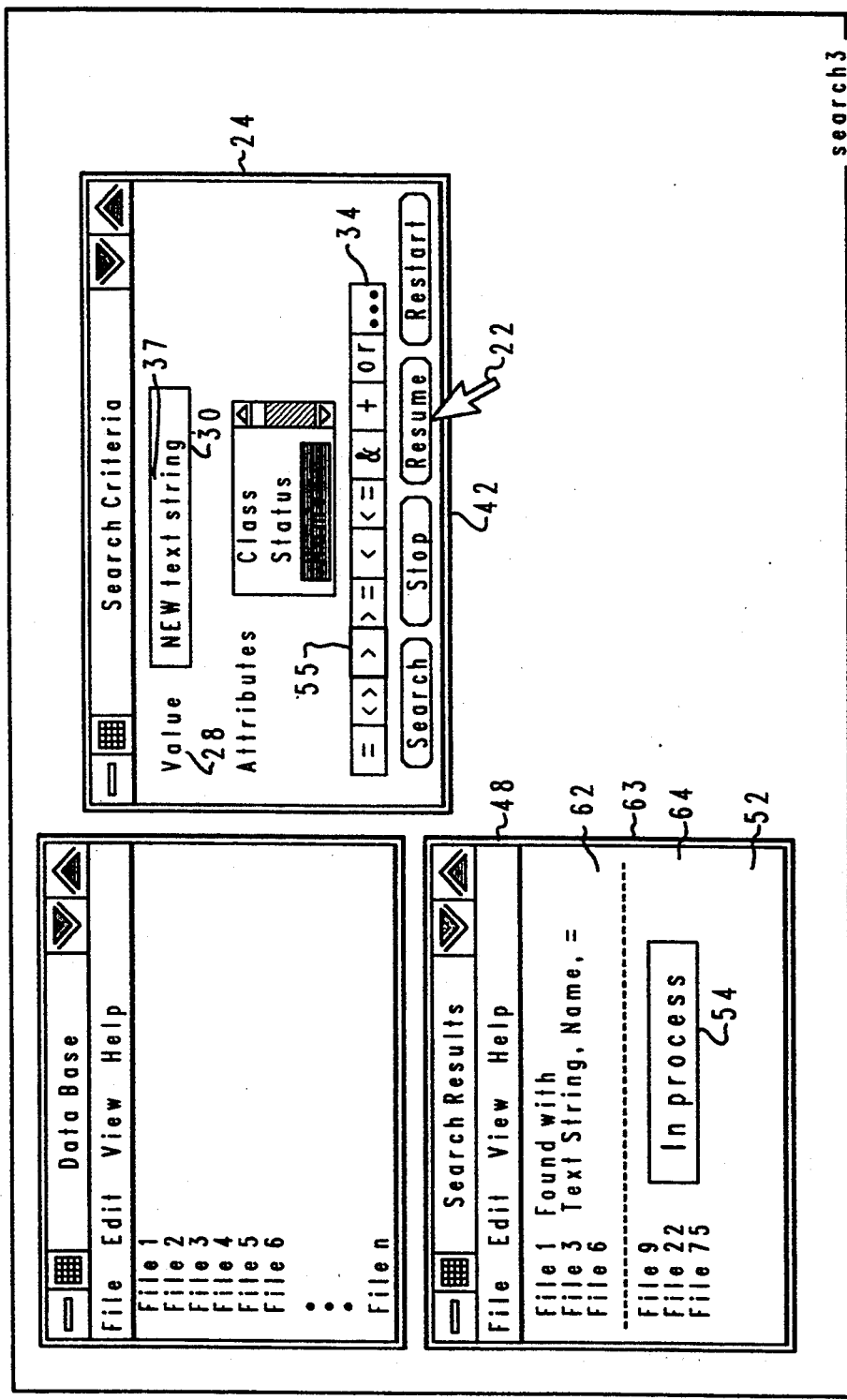
FIG. 4 is a pictorial representation of the plurality of windows imaged on a computer display screen utilizing a set of search criteria subsequent to the first.

FIG. 4 illustrates a pictorial representation of computer display screen 20 after modification of a search as provided by the present invention. Searches may be interrupted by user selection with the "Stop" button 40. This action reopens window 24 for the selection of new or modified search criteria. As illustrated, a new search has been entered through search criteria window 24 and includes a new value 37 in value entry field 30 and a new logical operator selected from operator button 34. Mouse pointer 22 has been moved to the "Resume" button 42 indicating resumption of the search with the new search criteria.

Search results window 48 reflects the selection of new search criteria. Results field 52 is divided by a hatched line 63 into two subsidiary fields 62 and 64, respectively. Subsidiary field 62 displays qualifying files found with the original search criteria. Search results subsidiary field 62 also illustrates the original search arguments as a search development aid to the user. Search results subsidiary field 64, in which in process bar 54 appears, displays files so far located using the new search criteria. "In Process" message 54 indicates that the database has not yet been exhausted and that additional files may be displayed as located.

With reference to FIGS. 5-11, there are depicted logic flow charts illustrating the search routines of the present invention.

Figure 5:
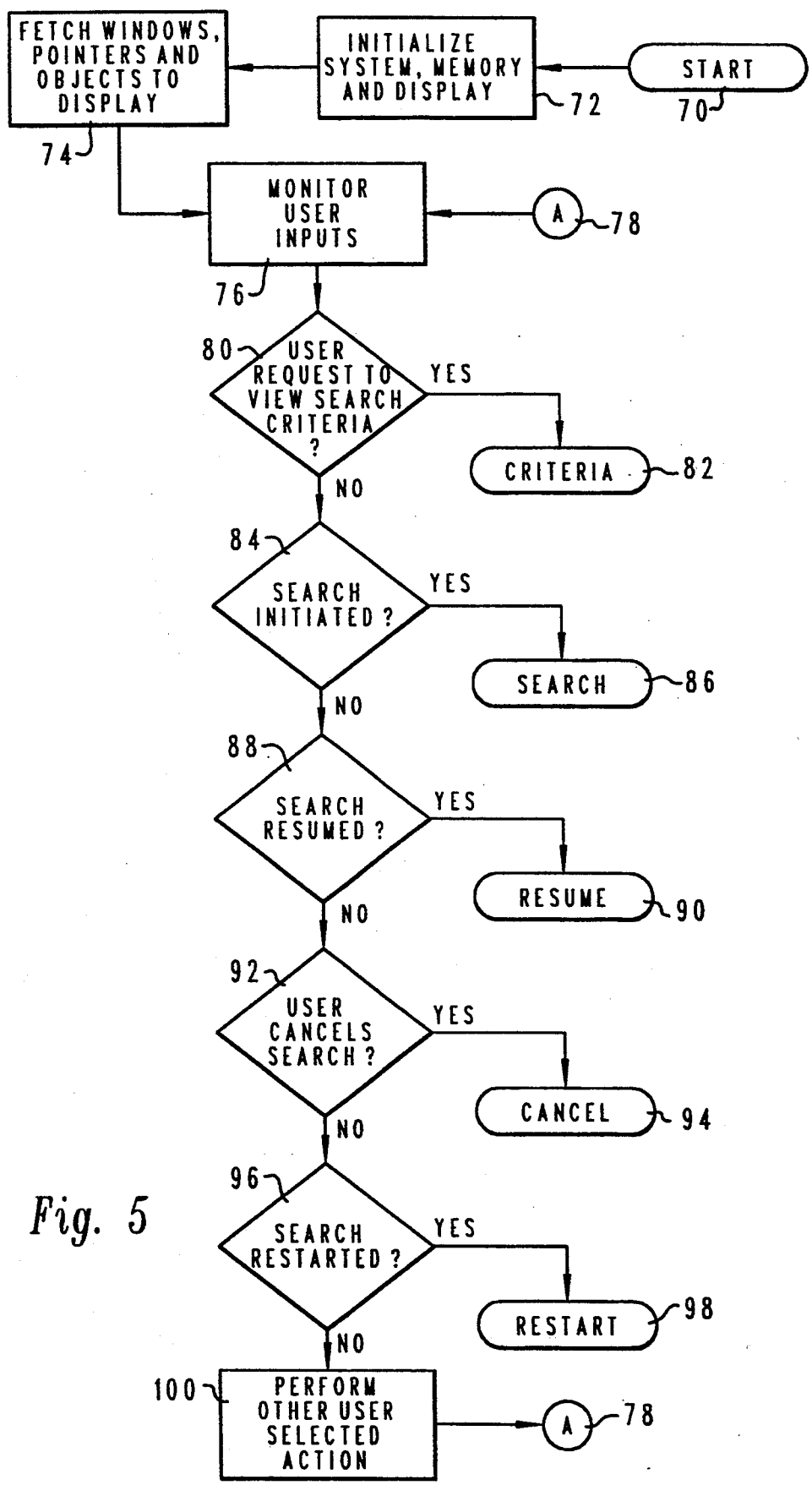
FIG. 5 is a logic flow diagram illustrating a portion of the method of the present invention.

FIG. 5 illustrates operation of the process of the invention on a typical personal computer, which begins with the loading of an operating system from peripheral memory. This occurs at block 70 labeled "Start" indicating power up and system tests and block 72 labeled "Initialize System, Memory and Display" indicating loading of an operating system. The present invention operates in a "windows" environment, which is preferably provided by the OS/2 ® operating system and an associated graphic user interface such as the "Presentation Manager" ® available from the International Business Machines Corporation. The Presentation Manager graphic user interface is a layer of software which resides on the operating system. The presentation manager fetches windows, pointers and objects for display screen 20 as illustrated by box 74.

Next, block 76 illustrates a wait period by the computer until a user initiates some action. Block 76 is also a reentry point indicated by the letter A, circle 78, from various other points in the process. At block 76 computer waits on user selection of a menu item from a window displayed on visual display device 16.

Next, blocks 80, 84, 88, 92, 96, and 100 illustrate possible responses by computer 12 after selection of an operation by a user. A number of responses are possible. Only those responses relating to database inquiry as modified by the present invention are illustrated in detail. Decision block 80 illustrates determination of whether the user has requested viewing current search criteria. If so, the process is diverted to a criteria routine by way of block 82. Otherwise, at decision block 84, it is determined whether the user has initiated a search using current criteria. If yes, program execution is diverted to a search subroutine via block 86. Otherwise, at decision block 88 it is determined if a current search has been resumed after an interruption. If the user has requested a resumption of a search, program execution is diverted to a resume routine indicated by block 90. Otherwise, program execution continues to block 92 where it is determined if a user has cancelled a search. If the user has selected cancellation of a search routine, execution is sent to a cancel routine via block 94. Otherwise, program execution continues to block 96 where it is determined if a search has been restarted. A restart routine is entered through block 98 from the yes branch from block 96. Otherwise, program execution moves to block 100 indicating some other user action has been selected not related to the search functions of the present invention. These other actions, such as word processing, do not directly relate to the present invention and are not discussed further here. From block 100, processing returns to block 76 via path 78 to monitor for another user input.

Figure 6:
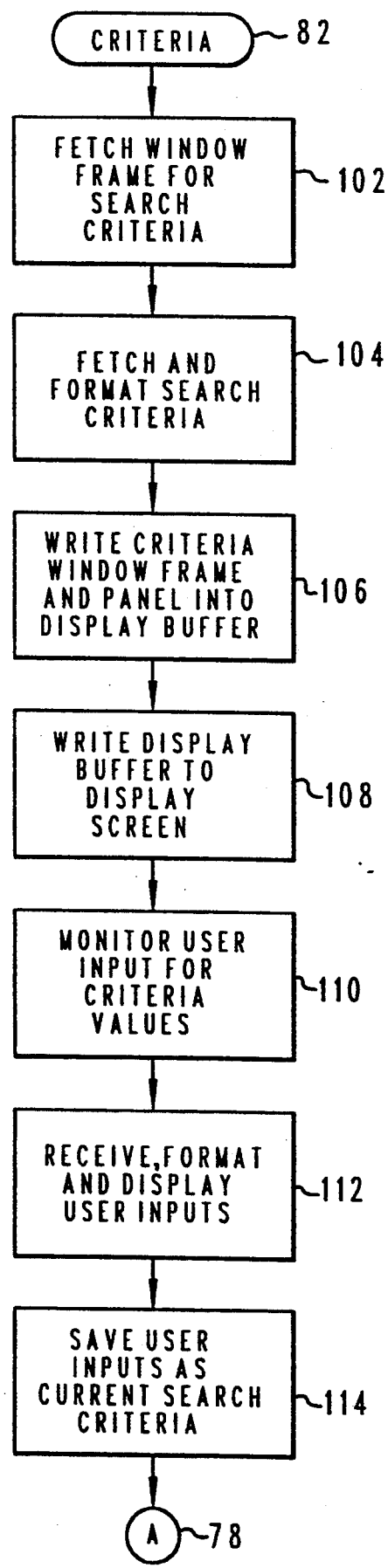
FIG. 6 is a logic flow diagram illustrating a portion of the method of the present invention.

FIG. 6 illustrates the criteria selection routine. The routine is entered through block 82. Next, block 102 is utilized to fetch window frame 24 for display to a user. Next, any prior search criteria are fetched and formatted for display utilizing block 104. Next, blocks 106 and 108 illustrate transfer of the window and search criteria to the display screen for user viewing. Next, block 110 illustrates the computer waiting for the user to change or to input new search criteria values. Next block 112 illustrates receipt of such user selected values whereupon they are formatted and displayed to the user for confirmation. Next block 114 illustrates the changes being saved as current search criteria and program execution being returned via block 78 to the monitor block 76 of FIG. 5.

Figure 7:
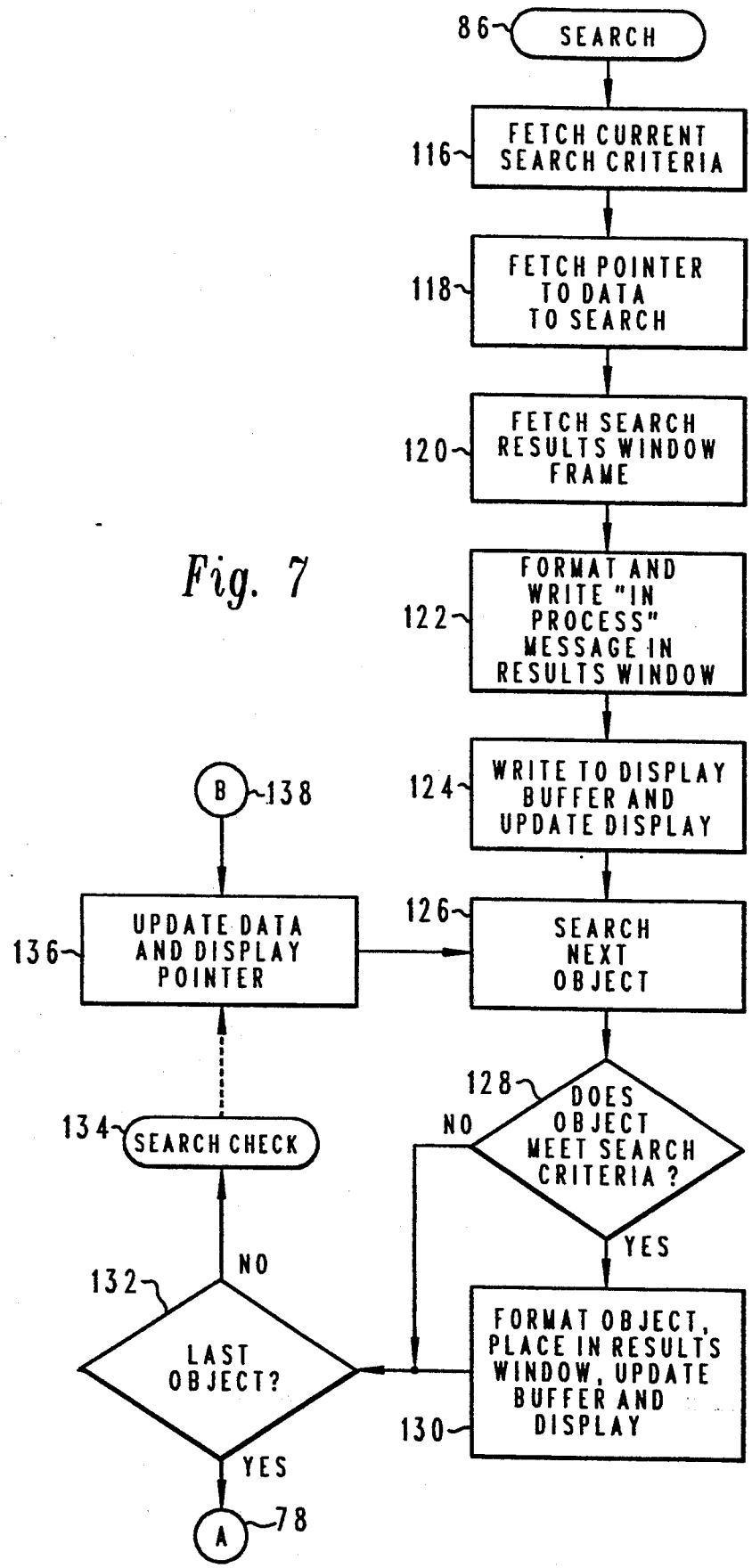
FIG. 7 is a logic flow diagram illustrating a portion of the method of the present invention.

FIG. 7 illustrates a search subroutine entered through block 86. From block 86, block 116 is utilized for fetching current search criteria in preparation for display of the criteria to a user and for evaluation of database objects in processing a search. Next, block 118 illustrates retrieval of a pointer to the database to be searched. The pointer indicates the specific object in the database to be searched and indirectly establishes the quanta of the database to be searched. Next, block 120 illustrates retrieval of the data supporting generation of a search results window frame, which is used to display results as obtained. Next, block 122 illustrates generation of an "In Process" message for inclusion in the results window frame question block 120. Next, block 124 illustrates writing the information to be generated on the display to a display buffer and the updating of the display with the search results window frame and in process data.

Next, at block 126, the search routine enters an evaluation process relating to database searching is executed in a conventional manner. Block 126 illustrates calling the next object in a database in comparison of the contents and attributes of the object with the search criteria. Next, decision block 128 illustrates comparison of the contents of the object with the search criteria. Where the object meets the search criteria the results are presented to a user as provided by block 130 along the yes branch from decision block 128. Block 130 is utilized to format and identify objects in the results window.

Next block 132 determines if the most recently searched object is the last object in a database, in which case the search has been completed. Decision block 132 follows both block 130 and the no branch from decision block 128. If an object is the last process execution is returned to block 76 via "A".

Search check block 134 follows the negative decision branch from block 132. The search check routine, which is described below, may result in the search being aborted under some conditions, and under other conditions reentering the search routine through entry point B at 138. Hatched line from search check 134 to block 136 indicates the usual result from operation of the search check routine and will be understood not to be the direct route stemming from execution of the routine. Next, block 136 illustrates updating the data and display pointers from which execution of the routine advances back to block 126. The process repeats until all objects of a database have been searched.

Figure 8:
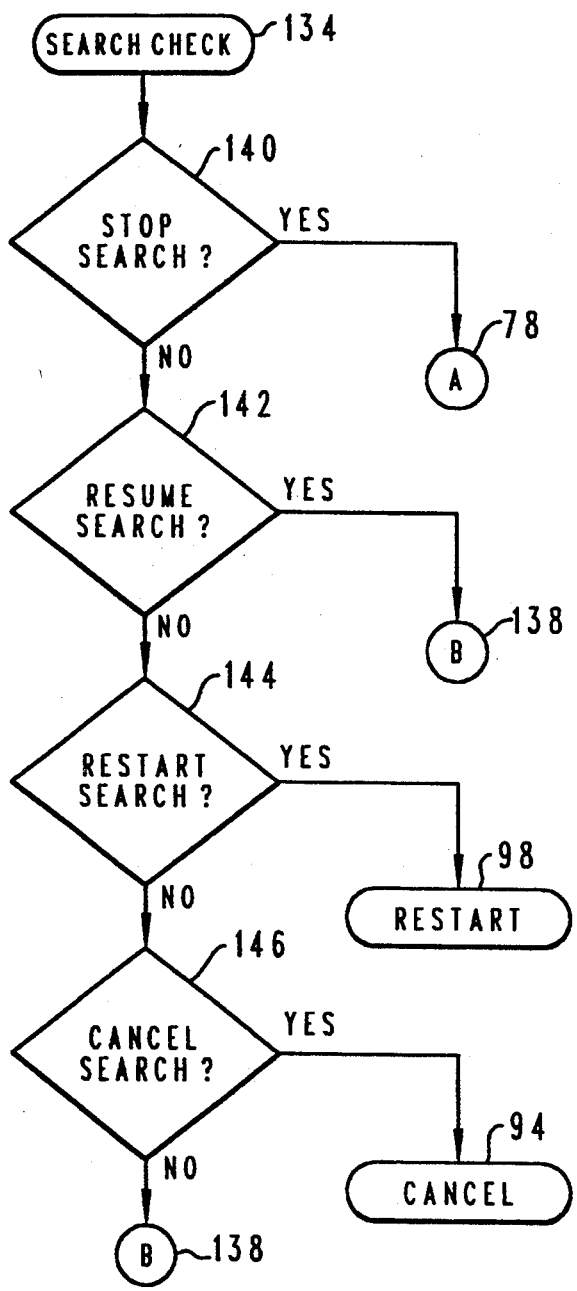
FIG. 8 is a logic flow diagram illustrating a portion of the method of the present invention.

The search check subroutine illustrated beginning at block 134 in FIG. 8 reflects monitoring for user involvement in the search. Next, decision block 140 is utilized to determine if a user has stopped the search. Stopping a search is to be distinguished from cancelling a search. The affirmative decision branch from decision block 140 returns execution of the process to block 76 in FIG. 5. The negative decision branch from block 140 results in the process advancing to decision block 142 where it is determined whether a user has instructed the computer to resume a search. The affirmative decision branch from block 142 returns the process to the search routine of FIG. 7 at letter "B" via block 138. The negative decision branch advances the process to the decision block 144 where it is determined if a user has instructed a restart of search. The affirmative branch where it takes the process through block 98 to a restart routine. The negative branch advances search execution decision block 146 where it is determine if the user has cancelled the search, i.e., instructed the computer to exit from the database search routine altogether. The affirmative branch takes execution of the process through block 94 to a cancel routine. A negative decision returns execution of the process through block 138 to the search routine as described above.

Figure 9:
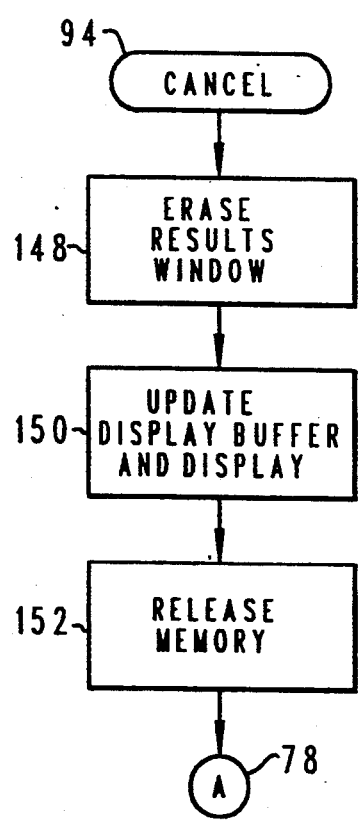
FIG. 9 is a logic flow diagram illustrating a portion of the method of the present invention.

FIG. 9 illustrates a cancel routine entered through block 94. The cancel routine releases computer memory for other programs. Block 148 illustrates, upon entry into the cancel routine, erasure of the results window from user view. Next, block 150 illustrates changing the display buffer and resulting display as a result of cancellation of the search routine. Next, block 152 illustrates the release of memory, here the main computer memory, from the program and information data required for execution of the search. Process execution is returned to user monitor status at block 76 at A via block 78.

Figure 10:
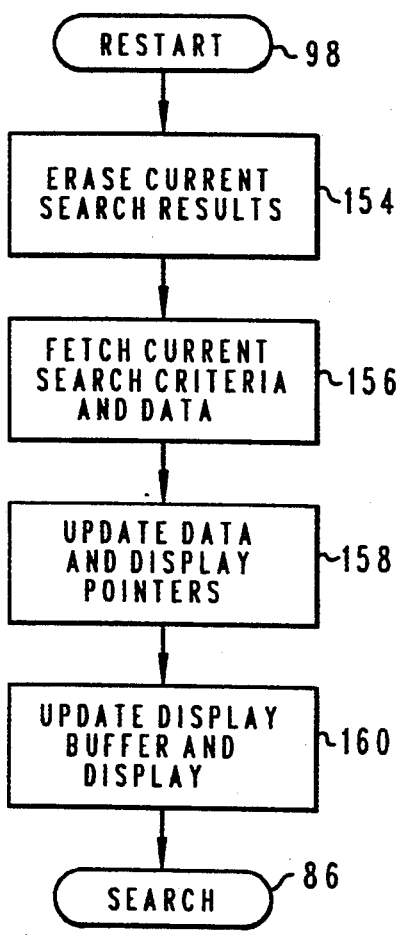
FIG. 10 is a logic flow diagram illustrating a portion of the method of the present invention.

FIG. 10 illustrates the restart routine entered via block 98. The restart routine is essentially initiation of a new search over an entire database. In order to display to a user information reflecting such a restart, and to execute the search over an entire database, certain changes in memory and repositioning of search pointers is required. Block 154, following entry into the restart routine, illustrates erasure of current search results. Next, block 156 illustrates the fetching of the current search criteria and data entered by the user. Next, block 158 illustrates updating data and display pointers for resuming the search and for indicating to the user the status of the search. Next block 160 illustrates updating of the display buffer and display in concordance with the updated data and display pointers. Next, block 86 illustrates return of the program to the search subroutine illustrated in FIG. 7.

Figure 11:
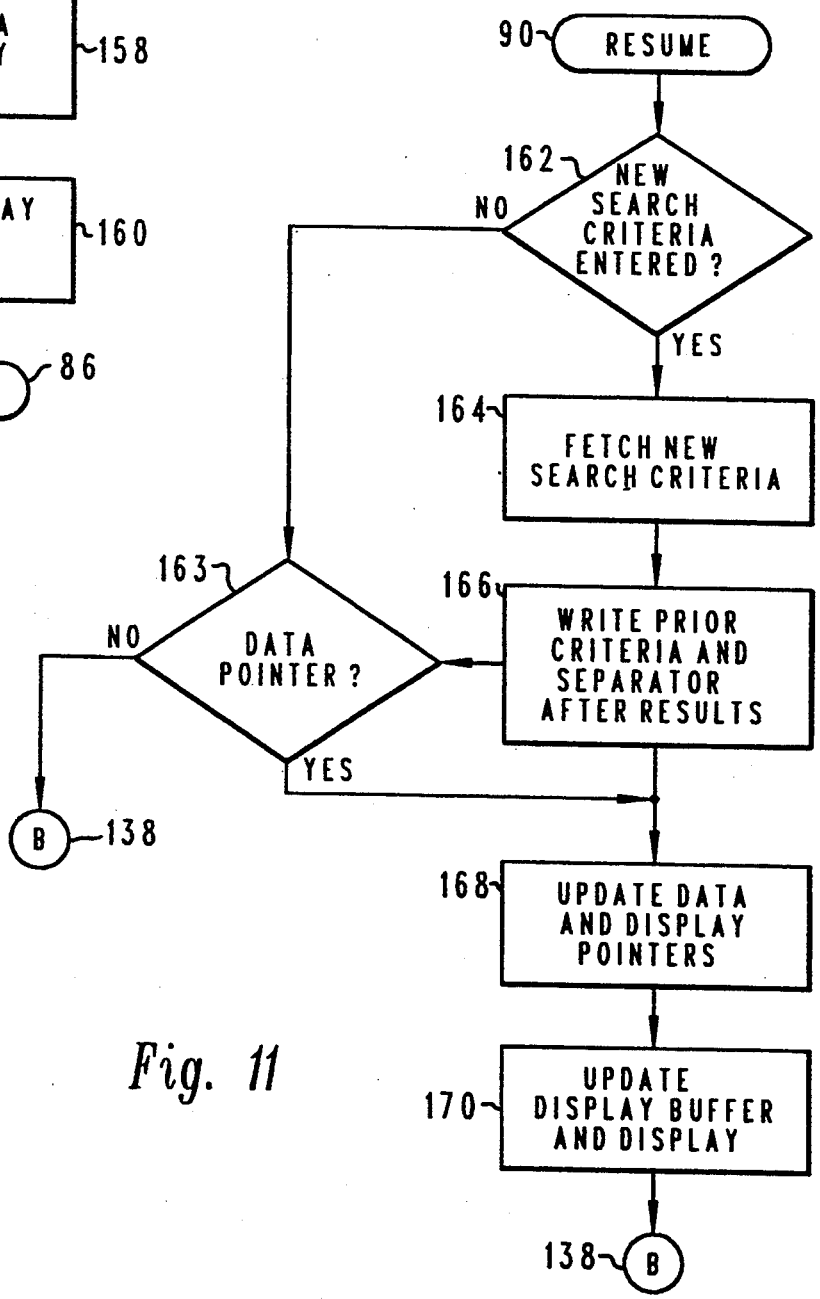
FIG. 11 is a logic flow diagram illustrating a portion of the method of the present invention.

FIG. 11 illustrates the "resume" routine utilized where a user determines that new search criteria are required, but that the entire database need not be searched. Resume can also be entered without modification of a search. Decision block 162 illustrates consideration of both possibilities. When new search criteria have been entered, process execution follows the affirmative decision path. Where no new search criteria have been entered, the decision program follows the negative decision path to decision block 163 where it is determined if the scope of the search has been changed. If the scope of the search is unchanged execution proceeds via block 138 back into the search routine of FIG. 7. Alternatively, process execution can be delivered to block 168 to permit repositioning of a search point. Block 164 follows the affirmative decision path from block 12 and illustrates fetching the new search criteria entered by the user. Next, block 161 illustrates writing the prior criteria and the separator after those results obtained using the prior criteria. Next block 168 allows for display and data pointers to be reset to define the ambit of the new search with respect to objects in the database. Next, block 170 illustrates update of the display buffer and display with the new information and return of the program to searching via block 138 at letter B.

A user gains from employing the present invention with an otherwise conventional database search scheme by gaining the ability to dynamically revise search parameters during the course of a search. This feature saves the user considerable time and frustration in the employment of database searching.

While the invention has been particularly shown and described with reference to a preferred embodiment it will be understood by those skilled in the art that various changes in form and detail may be made therein without departing from the spirit and scope of the invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method of developing queries into a database, the method comprising the steps of performed by a data processing system of:

responsive to user selection of an initial query, displaying the initial query on a display device and passing the initial query to the database as search criteria for a progressive search of the database;

responsive to the database returning an identification of an object matching the search criteria, placing the identification of the object on the display device when found such that the identification is visually associated with the initial query, or with a modified query, if present while continuing the progressive search;

responsive to user selection of a modified query, interrupting operation of the database;

responsive to user selection of a modified query, displaying the modified query and passing the initial query and the modified query to the database as the search criteria for the progressive search of the database;

upon passing of the modified criteria to the database, allowing the user to select resumption of the search where interrupted or from a selected object in the database; and returning to the placing step until all objects in the database have been compared to the search criteria.

2. The method as set forth in claim 1, and further comprising:

displaying a history of the initial query and the modified query.

3. The method as set forth in claim 2, wherein the displaying step includes visually linking the identification for an object with the initial or modified query depending on which of the initial or modified query criteria were the current search criteria when the object was retrieved.

4. A data processing system for developing queries into a database, said data processing system comprising:

means responsive to user selection of an initial query for displaying the initial query on a display device and passing the initial query to the database as search criteria for a progressive search of the database;

means responsive to the database returning an identification of an object matching the search criteria for placing the identification of the object on the display device when found such that the identification is visually associated with the initial query, or with a modified query, if present while continuing the progressive search;

means responsive to user selection of a modified query for interrupting operation of the database;

means responsive to user selection of a modified query for displaying the modified query and passing the initial query and the modified query to the database as the search criteria for the progressive search of the database;

means for allowing the user to select resumption of the search wherein interrupted or from a selected objection the database upon passing of the modified criteria to the database; and means for returning to the placing step until all objects in the database have been compared to the search criteria.

* * * * *